US011861922B2

(12) United States Patent
Chen et al.

(10) Patent No.: US 11,861,922 B2
(45) Date of Patent: Jan. 2, 2024

(54) SYSTEM AND METHOD FOR EXTRACTING TARGET DATA FROM LABELS

(71) Applicant: ZEBRA TECHNOLOGIES CORPORATION, Lincolnshire, IL (US)

(72) Inventors: Dongqing Chen, East Setauket, NY (US); Wen-Yung Chang, Lake Grove, NY (US); David S. Koch, East Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/852,248

(22) Filed: Apr. 17, 2020

(65) Prior Publication Data
US 2021/0326630 A1 Oct. 21, 2021

(51) Int. Cl.
*G06K 19/00* (2006.01)
*G06V 30/148* (2022.01)
*G06T 11/20* (2006.01)
*G06K 19/06* (2006.01)
*G06V 10/70* (2022.01)
*G06V 30/10* (2022.01)

(52) U.S. Cl.
CPC ..... *G06V 30/153* (2022.01); *G06K 19/06028* (2013.01); *G06T 11/20* (2013.01); *G06V 10/768* (2022.01); *G06T 2210/12* (2013.01); *G06V 30/10* (2022.01)

(58) Field of Classification Search
None
See application file for complete search history.

(56) References Cited

U.S. PATENT DOCUMENTS

| 7,311,256 | B2 | 12/2007 | Torchalski |
| 9,092,667 | B2 | 7/2015 | He et al. |
| 10,095,925 | B1 * | 10/2018 | Tripuraneni ....... G06V 30/1473 |
| 10,558,831 | B1 | 2/2020 | Chen et al. |
| 2002/0037097 | A1 * | 3/2002 | Hoyos ..................... G07F 19/20 382/137 |
| 2009/0285482 | A1 * | 11/2009 | Epshtein ............ G06K 9/00463 382/176 |
| 2010/0135578 | A1 * | 6/2010 | Nakamura ............... G06K 9/38 382/190 |
| 2011/0063468 | A1 * | 3/2011 | Ahn ..................... G06K 9/3258 348/222.1 |

(Continued)

OTHER PUBLICATIONS

Parascript, LLC, "Parascript Address Parcel" [info@parascript.com], 2016.

(Continued)

*Primary Examiner* — Oneal R Mistry

(57) ABSTRACT

A computing device for extracting target data from a source document includes: a memory storing target data extraction rules; a processor connected with the memory, the processor configured to: obtain text recognition data extracted from an image of the source document, the text recognition data indicating locations of text structures in the source document; define text lines based on the text recognition data; identify a reference string from the text recognition data; select a subset of the text lines based on a location of the reference string and the target data extraction rules; and output the subset of the text lines as the target data.

20 Claims, 8 Drawing Sheets

(56) References Cited

U.S. PATENT DOCUMENTS

| | | | | |
|---|---|---|---|---|
| 2012/0070055 A1* | 3/2012 | Liu | ................... | G06T 7/0016 |
| | | | | 382/131 |
| 2015/0040001 A1* | 2/2015 | Kannan | ................ | G06F 40/186 |
| | | | | 715/243 |
| 2017/0337443 A1* | 11/2017 | Kolton | ................... | G06K 9/344 |
| 2020/0082218 A1* | 3/2020 | Hoehne | ................... | G06N 3/08 |
| 2021/0248420 A1* | 8/2021 | Zhong | ................... | G06V 10/82 |

OTHER PUBLICATIONS

Zebra, SimulScan Fact Sheet, "Next generation automated data capture for Android" (Nov. 9, 2019).

\* cited by examiner

SYSTEM AND METHOD FOR EXTRACTING TARGET DATA FROM LABELS

BACKGROUND

The transportation and logistics industry uses printed labels on parcels for parcel service. Effectively and accurately retrieving data, such as a postal address, from labels or other structured text documents, contributes to automated delivery route planning, address verification and parcel delivery confirmation. However, as the labels are printed, retrieving such data may be a manual and time-consuming process. Systems with text recognition capabilities may be limited based on storage of predefined templates identifying locations of the data to be extracted.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
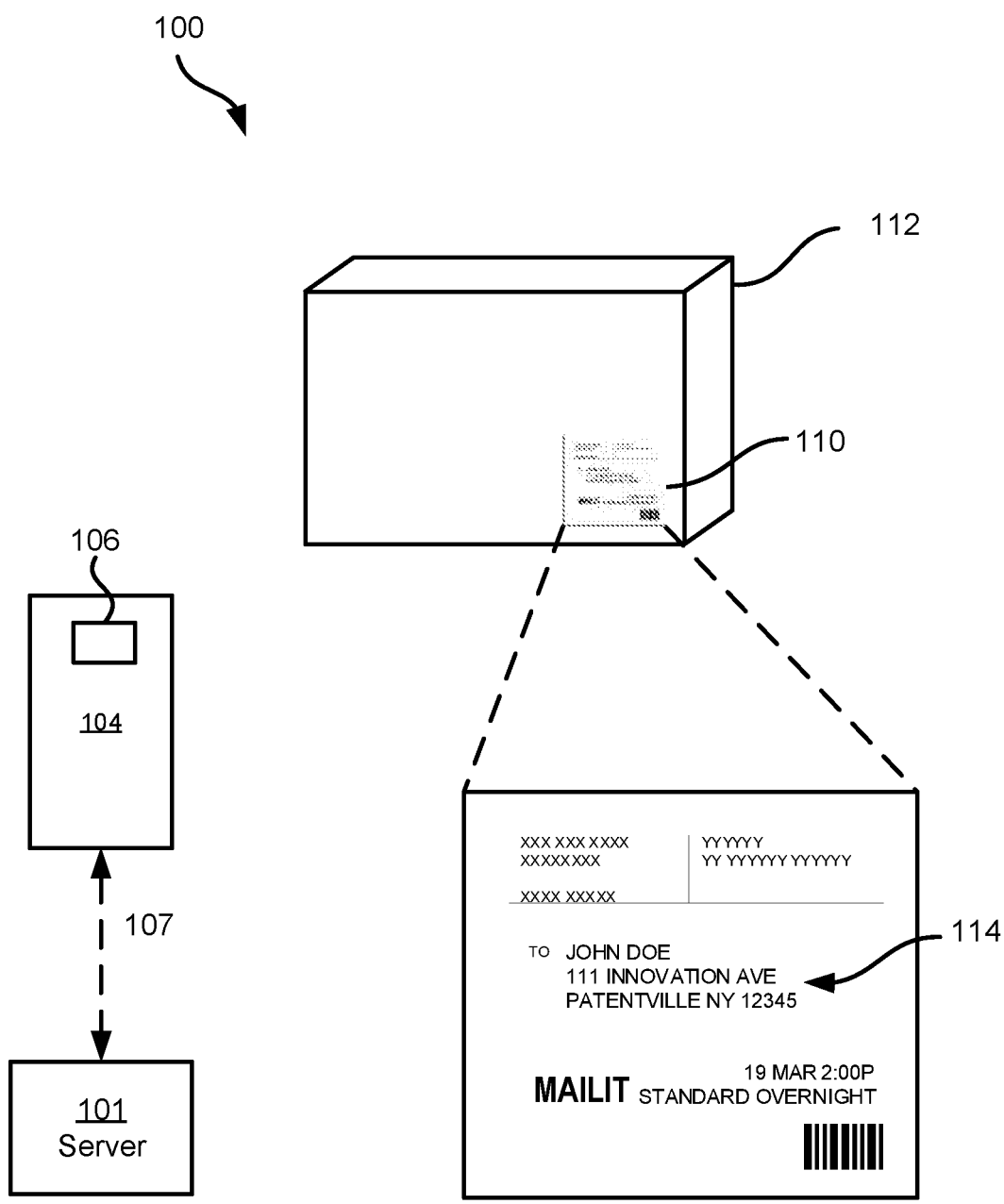
FIG. 1 is a block diagram of an example data extraction system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device for extracting target data from a source document. The computing device includes: a memory storing target data extraction rules; a processor connected with the memory, the processor configured to: obtain text recognition data extracted from an image of the source document, the text recognition data indicating locations of text structures in the source document; define text lines based on the text recognition data; identify a reference string from the text recognition data; select a subset of the text lines based on a location of the reference string and the target data extraction rules; and output the subset of the text lines as the target data.

Additional examples disclosed herein are directed to a method for extracting target data from a source document. The method comprises: storing target data extraction rules; obtaining text recognition data extracted from an image of the source document, the text recognition data indicating locations of text structures in the source document; defining text lines based on the text recognition data; identifying a reference string from the text recognition data; selecting a subset of the text lines based on a location of the reference string and the target data extraction rules; and outputting the subset of the text lines as the target data.

FIG. 1 depicts a data extraction system 100 in accordance with the teachings of this disclosure. The system 100 includes a server 101 in communication with a computing device 104 (also referred to herein as simply the device 104) via a communication link 107, illustrated in the present example as including wireless links. For example, the link 107 may be provided by a wireless local area network (WLAN) deployed by one or more access points (not shown). In other examples, the server 101 is located remotely from the device 104 and the link 107 may therefore include one or more wide-area networks such as the Internet, mobile networks, and the like.

The system 100 is deployed to extract target data from a source document, such as a label 110, for example on a package 112. The system 100 may be configured to extract, from the label 110, address data 114 indicating a destination of the package 112. In other examples, the system 100 may extract other target data from the label 110, such as a recipient name, a cargo type, or other shipping data. More generally, the system 100 is deployed to extract target data from a source document, wherein the target data has a predictable spatial text pattern relative to a well-defined and recognizable reference string. Such a data extraction operation will be described in further detail below. The system 100 thus allows target data to be extracted without the burden of storing templates indicating where the target data ought to be for each variation of source document which may contain the target data (e.g., based on different company shipping labels, different document types, etc.).

The device 104 further includes an image sensor 106, such as a color image sensor, to obtain image data representing the label 110. The image data may be used in the data extraction operation to extract the target data.

Figure 2:
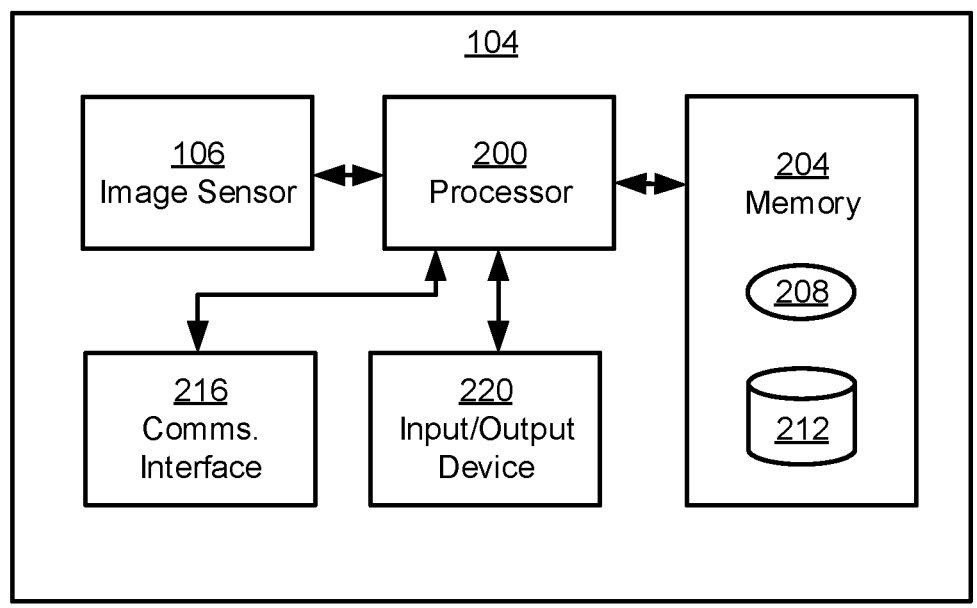
FIG. 2 is a block diagram illustrating additional components of the system of FIG. 1.

Referring to FIG. 2, the mobile computing device 104, including certain internal components, is shown in greater detail. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores a control application 208 which, when executed by the processor 200, configures the processor 200 to perform various functions discussed below in greater detail and related to the data extraction operation of the device 104. The application 208 may also be implemented as a suite of distinct applications. The processor 200, when so configured by the execution of the application 208, may also be referred to as a controller 200.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the data extraction operations discussed herein.

The memory 204 also stores a repository 212 containing, for example, data extraction rules. The data extraction rules may include, for example, regular expressions defining possible reference strings, rules regarding spatial relationships between a detected reference string and the target data, rules for defining text lines and other text structures, or the like. Other rules for use in the data extraction operation performed by the device 104 may also be stored in the repository 212.

The device 104 also includes a communications interface 216 interconnected with the processor 200. The communications interface 216 includes suitable hardware (e.g. transmitters, receivers, network interface controllers and the like) allowing the device 104 to communicate with other computing devices—particularly the server 101—via the link 107. The specific components of the communications interface 216 are selected based on the type of network or other links that the device 104 is to communicate over. The device 104 can be configured, for example, to communicate with the server 101 via the link 107 using the communications interface to send extracted target data to the server 101.

As shown in FIG. 2, the processor 200 is interconnected with the image sensor 106. The processor 200 is enabled, via such connections, to issue commands for performing a data extraction operation. Specifically, the processor 200 may control the image sensor 106 to capture image data representing the label 110.

The processor 200 may also be connected to one or more input and/or output devices 220. The input devices 220 can include one or more buttons, keypads, touch-sensitive display screens or the like for receiving input from an operator, for example to initiate the data extraction operation. The output devices 220 can further include one or more display screens, sound generators, vibrators, or the like for providing output or feedback to an operator, for example to output the extracted target data.

Figure 3:
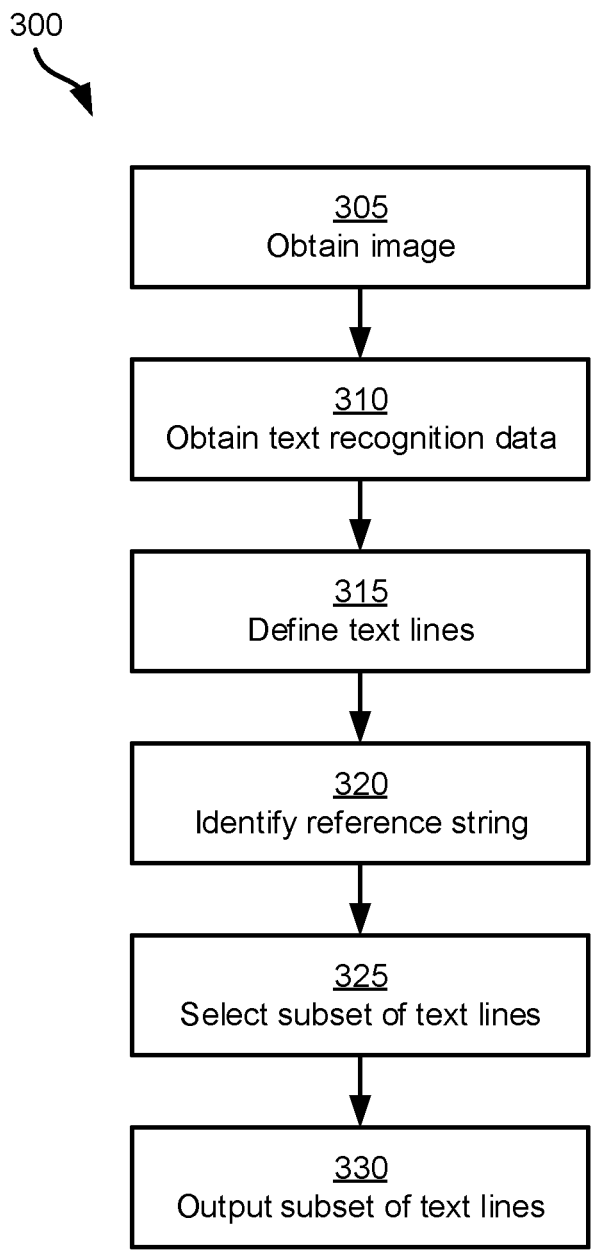
FIG. 3 is a flowchart of an example method of extracting target data in the system of FIG. 1.

The functionality of the device 104, as implemented via execution of the applications 208 by the processor 200 will now be described in greater detail, with reference to FIG. 3. FIG. 3 illustrates a method 300 of extracting target data from a label, which will be described in conjunction with its performance in the system 100, and in particular by the device 104, with reference to the components illustrated in FIGS. 1 and 2. In other examples, the method 300 may be performed by other suitable computing devices, such as the server 101.

The method 300 begins at block 305 in response to an initiation signal, such as an input at the input/output device 220. For example, an operator may activate a trigger button to initiate the method 300. At block 305, the device 104 is configured to obtain an image representing the label 110. For example, the processor 200 may control the image sensor 106 to capture image data representing the label 110. In other examples, the image may be obtained from an external or other source, for example via the communications interface 216.

In some examples, the device 104 may also perform preprocessing operations on the image. For example, the device 104 may identify one or more superfluous features, such as barcodes, logos, excess space around the label 110, or other image features and remove the superfluous features. For example, the device 104 may crop the excess space around the label 110 out of the image, or may cover the barcode with a block of a predefined color (e.g., white). In some examples, prior to covering the barcode, the device 104 may decode the barcode for further processing, as will be described further below.

At block 310, the device 104 obtains text recognition data. For example, the device 104 may upload the image obtained at block 305 to a cloud-based or other external service for applying optical character recognition (OCR) process or other text recognition processes on the image. The external service may then return the text recognition data. In other examples, the device 104 may apply OCR or other text recognition processes on the image locally to obtain the text recognition data. Generally, the text recognition data indicates locations of text structures on the label 110. For example, the text recognition data may indicate the coordinates of vertices of bounding boxes around each page, block, paragraph, word, and symbol.

At block 315, the device 104 defines text lines on the label 110 based on the text recognition data obtained at block 310. In particular, in structured text documents, such as on labels, a text line consisting of words in a semantic context may provide logical text structure. However, text lines are often not output as a text structure from a text recognition process. Accordingly, the device 104 may define text lines based on the text recognition data.

Figure 4:
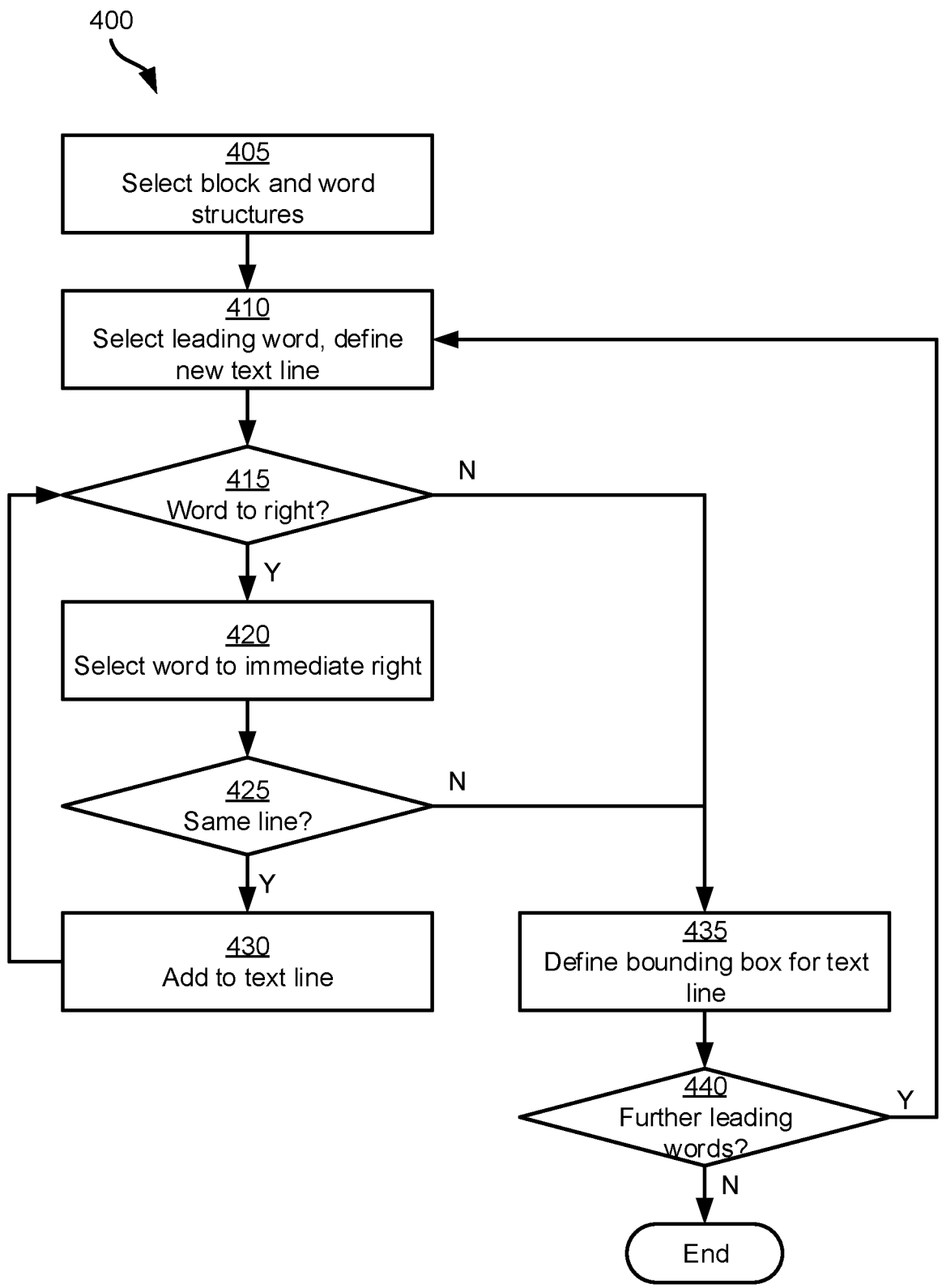
FIG. 4 is a flowchart illustrating an example performance of block 315 of the method of FIG. 3.

For example, referring to FIG. 4, an example method 400 of defining text lines is depicted.

At block 405, the device 104 selects block and word text structures for further processing. In particular, structured text documents, such as labels, often have only one page, and hence the page element does not need to be processed. Paragraphs and symbols (i.e., single characters) do not provide as much semantic meaning, and are also not processed. In particular, text recognition processes are often designed for unstructured texts in natural language. Accordingly, paragraphs may be challenging to define for structured documents. Thus, the page, paragraph and symbol text structures are discarded or otherwise designated for not processing.

At block 410, the device 104 selects a leading word and defines a new text line, with the leading word as the most recent word in the text line. In particular, a leading word may be defined as the top-left word in a given block, which has not yet been assigned to a text line. That is, a leading word may be defined according to the relative proximity of words to the top edge of the corresponding block, as well as the left edge of the corresponding block.

At block 415, the device 104 determines whether there is a word to the right of the most recent word in the text line. For example, on the first iteration, the device 104 may determine whether there are any words to the right of the leading word selected at block 410. If the determination is affirmative, the device 104 proceeds to block 420.

At block 420, the device 104 selects the word immediately to the right of the most recent word in the text line and proceeds to block 425.

At block 425, the device 104 determines whether the selected word satisfies a same-line condition. In particular, the same-line condition may be based on one or more of: a distance between words, a character height comparison, a word orientation, and a word alignment. For example, the same-line condition may evaluate the selected word and the most recent word to determine whether the words are within a threshold distance, whether the character heights of words are within a threshold percentage, whether the words are oriented in the same direction, and whether the words are approximately horizontally aligned.

If, at block 425, the selected word satisfies the same-line condition, the device 104 proceeds to block 430. At block 430, the selected word is added to the text line as the most recent word. The device 104 then returns to block 415 to determine whether any additional words are to be added to the text line.

If, at block 425, the selected word does not satisfy the same-line condition, the device 104 determines that the text line is complete and proceeds to block 435. Similarly, if, at block 415, the device 104 determines that there are no further words to the right of the most recent word, the device 104 determines that the text line is complete and proceeds to block 435. At block 435, the device 104 defines a bounding box for the text line. Specifically, the bounding box surrounds all words in the text line, including the leading word and any additional words satisfying the same-line condition. More particularly, the bounding box may be defined as the smallest bounding box surrounding all the words in the text line. The text line is thus defined by its bounding box and its member words.

At block 440, after defining the text line and its bounding box, the device 104 determines whether there are any further leading words. If there are, the device 104 returns to block 410 to select a new leading word and define a new text line. If the determination at block 440 is negative, the device 104 determines that all text lines have been defined and the method 400 ends.

Figure 5A:
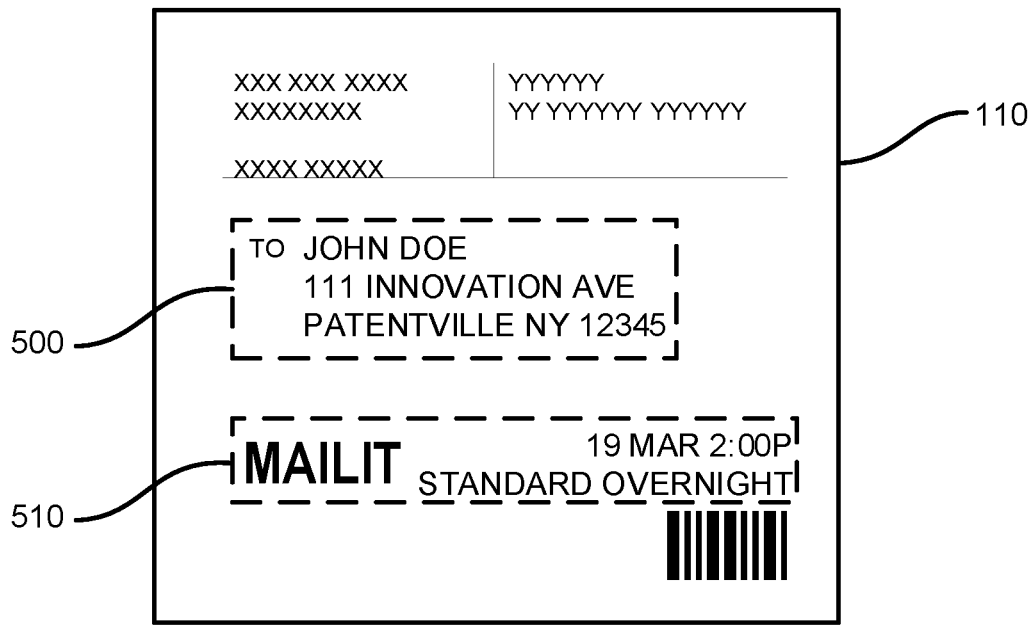
FIGS. 5A and 5B are schematic diagrams illustrating the performance of block 315 of the method of FIG. 3.
Figure 5B:
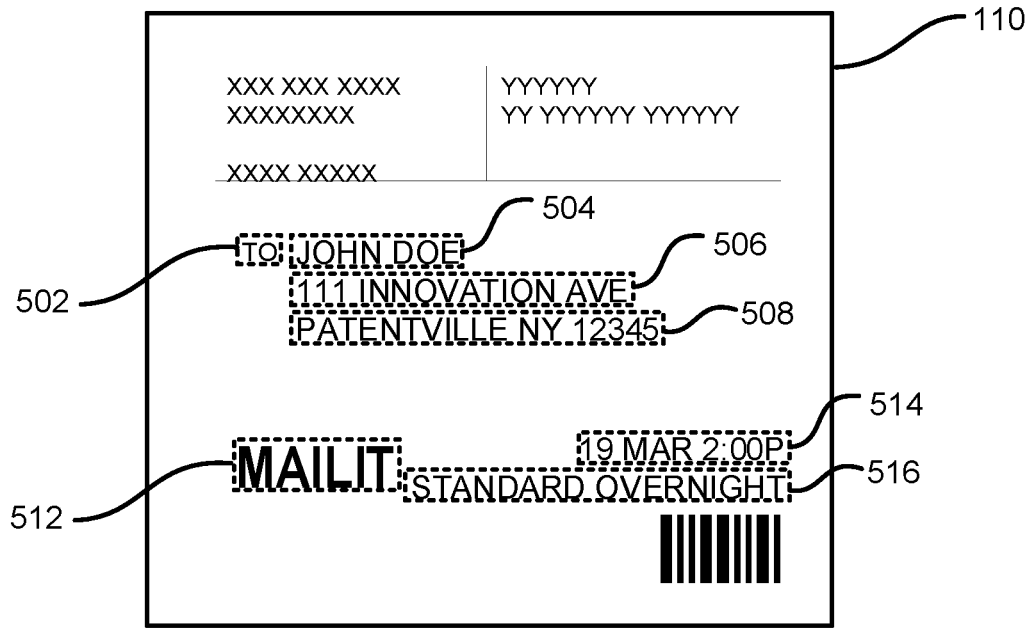

For example, referring to FIGS. 5A and 5B, a schematic of the text line detection of the label 110 is depicted. The label 110 has blocks 500 and 510.

In the block 500, the word "TO" may be selected as a leading word. On iterating through the method 400, the device 104 may determine that the word "JOHN", to the right of the leading word "TO" does not satisfy a same-line condition, due to the spacing between "TO" and "JOHN" exceeding a threshold distance. Accordingly the word "TO" may be defined as a text line 502. After having assigned the word "TO" to a the text line 502, the word "JOHN" may subsequently be defined and selected as a leading word. Iterating through the method 400, text lines 504, 506, and 508 are also defined.

In the block 510, the word "MAILIT" may be selected as a leading word. In other examples, the word "19" may be selected as a leading word. The definition of leading words may differ, for example, based on the weighting of the top edge proximity or the left edge proximity. For example, when "MAILIT" is the leading word, the device 104 may determine that neither of the words "19" and "STANDARD" satisfy the same-line condition, due to the difference in character size, spacing between the words exceeding the threshold distance, and the lack of horizontal alignment of either the top or bottom edges of the words. Accordingly, text lines 512, 514, and 516 may be defined in the block 510.

Returning now to FIG. 3, after having defined the text lines, at block 320, the device 104 is configured to identify a reference string in the text lines. Generally, the reference string may be a word matching a predefined regular expression and having a specific spatial relationship with the target data. In some examples, any potential reference strings (i.e., words matching the regular expression) may be verified against a predetermined list of valid reference strings. For example, a ZIP code may be used as a reference string to extract an US postal address. Further, any detected five-digit words matching the regular expression (i.e., potential ZIP codes) may be verified against a predetermined list of all valid ZIP codes.

In some examples, words adjacent the potential reference strings may also be checked for other validity conditions, to improve accuracy of the identification of the reference strings. For example, the word before or after a detected ZIP code may be checked to determine whether the word matches the name or abbreviation of a US state.

In some examples, prior to searching the text lines for a reference string, the device 104 may restrict the text lines to search based on the spatial relationship of text lines with other identifying features. For example, if, at block 305, a barcode is detected in the image, the device 104 may decode the barcode to obtain barcode data. The barcode data may be used to retrieve data indicative of an approximate spatial relationship between the barcode and the reference string. Accordingly, the device 104 may utilize the spatial relationship and the detected location of the barcode to identify an approximate location of a reference string. The device 104 may select text lines within a threshold distance of the approximate location and search the selected text lines for a reference string.

At block 325, the device 104 selects a subset of text lines based on the location of the reference string, as obtained from the text recognition data, and target data extraction rules.

In particular, the target data extraction rules may define a spatial relationship between the text lines associated with the target data and the reference string. For example, the text lines containing the target data may be aligned (e.g., left aligned) with the text line containing the reference string, and may be within a threshold distance above or below the line containing the reference string. In other examples, different alignments, threshold distances or other spatial relationships may also be defined by the target data extraction rules. Further, the target data extraction rules may define characteristics of valid text lines associated with the target data. For example, the text lines containing the target data may have homogeneous font features (e.g., have similar symbol sizes), be contained in the same block, or the like. In other examples, the target data extraction rules may define regular expressions that text lines containing the target data satisfies.

In some examples, after selecting text lines satisfying the target data extraction rules, the device 104 may verify the location of the text lines against other identifying features. For example, if at block 305, a barcode is detected in the image, the device 104 may decode the barcode to obtain barcode data. The barcode data may be used to retrieve data indicative of a defined approximate spatial relationship between the barcode and target data text lines. The device 104 may verify the relative spatial relationship between the detected barcode and the selected subset of text lines against the defined spatial relationship. If the verification fails, the device 104 may end the process, or may provide the selected subset of text lines with an indication of the failed verification.

At block 330, the selected subset of text lines is output as the target data. In some examples, at block 320, the device 104 may identify more than one valid reference string. In such examples, the device 104 may proceed through the method 300 with each of the detected reference strings. For example, a shipping label may include multiple addresses, such as a recipient address and a sender address. Accordingly, at block 330, the device 104 may output multiple selected subsets of text lines as the target data based on the corresponding reference strings.

Figure 6:
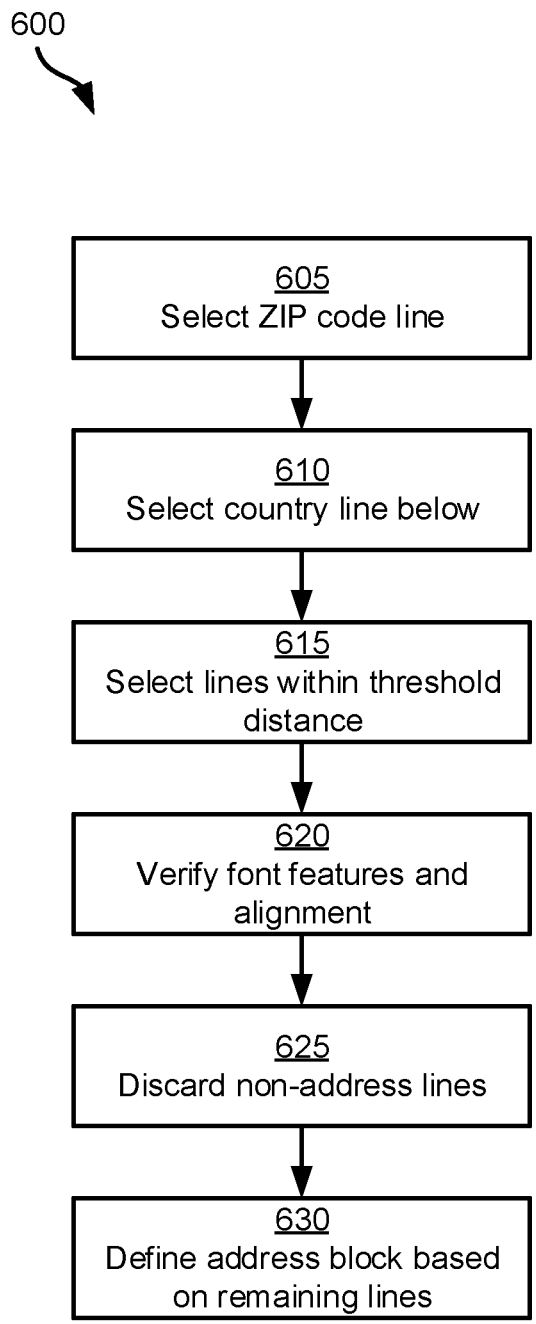
FIG. 6 is a flowchart illustrating an example performance of block 325 of the method of FIG. 3.

Referring to FIG. 6, an example method 600 of selecting a subset of text lines (e.g., during the performance of block 325) representing a US postal address is depicted. The US postal address extraction may utilize ZIP codes as reference strings.

At block 605, the device 104 first selects, as part of the address block (i.e., the subset of text lines representing the US postal address), the text line containing the ZIP code (also referred to herein as the ZIP code line).

At block 610, the device 104 checks the text line immediately below the ZIP code line to determine whether it is to be added to the address block. If the line below the ZIP code line specifies the country (e.g., matches one of US, USA, U.S.A., or United States of America) and is left-aligned with the ZIP code line, then it is a valid address block line, and is also added to the address block. If it does not specify the country, or is not left-aligned, then it is omitted.

At block 615, the device 104 selects text lines within a threshold distance of the ZIP code line. A vertical threshold distance may be defined based on the height of the bounding box of the ZIP code line, to account for the font size of the text on the label. For example, the threshold distance may be defined to be three times the height of the ZIP code line. Further, the device may select text lines within a threshold distance to the left (or right) of the ZIP code line to account for spacing based on city names or other structured text constraints of the label. For example, the threshold distance may be defined to be five times the width of the ZIP code word.

Further, US postal address blocks are consistently parsed as a single block based on the structured text constraints of standard labels. Accordingly, in some examples, the device may select, rather than individual text lines, a block having at least one text line within the specified threshold distances.

At block 620, the device 104 verifies the font features and the alignment of the text lines in the block selected at block 615. For example, lines in the address block above the ZIP code line have homogeneous font features (i.e., characters of consistent heights). Further, lines in the address block above the ZIP code line are left-aligned. Text lines failing the font homogeneity and alignment conditions are discarded.

Figure 7:
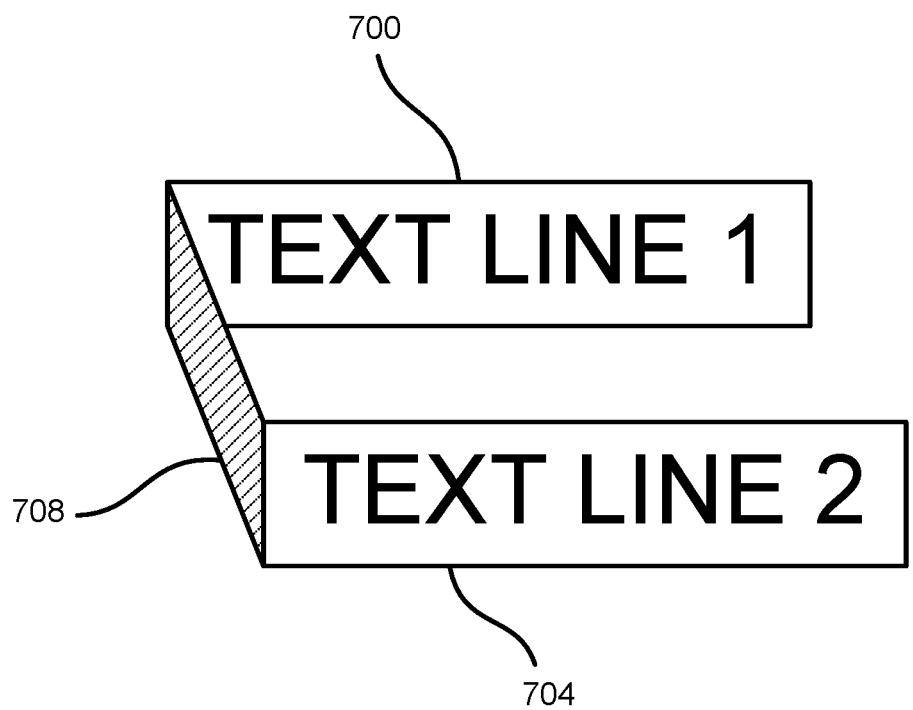
FIG. 7 is a schematic diagram illustrating an example performance of block 620 of the method of FIG. 6.

In particular, the device 104 may determine that two text lines are left aligned (or otherwise aligned) based on the bounding boxes of the two text lines. For example, as illustrated in FIG. 7, the bounding boxes of two text lines 700 and 704 are depicted. The device 104 may construct a quadrilateral 708 between the top left corner of the first text line 700, the top left corner of the second text line 704, the bottom left corner of the second text line 704, and the bottom left corner of the first text line 700. If the computed area of the quadrilateral 708 is below a threshold value, the two text lines 700 and 704 are determined to be aligned. Further, in some examples, the threshold value may be dynamically computed according to the heights of the text lines 700 and 704, and the average width of symbols or characters contained in the text lines 700 and 704.

Returning to FIG. 6, at block 625, the device 104 discards non-address lines. In some cases, the address blocks may contain non-address information, such as an entity name or a telephone number. Address lines may be differentiated by matching the lines to regular expressions including words that are digits (e.g., representing a street number or PO box) and one or more alphanumeric words (e.g., representing a street name). Text lines which fail to match the regular expressions are discarded.

At block 630, the remaining lines are defined to be the address block.

Figure 8:
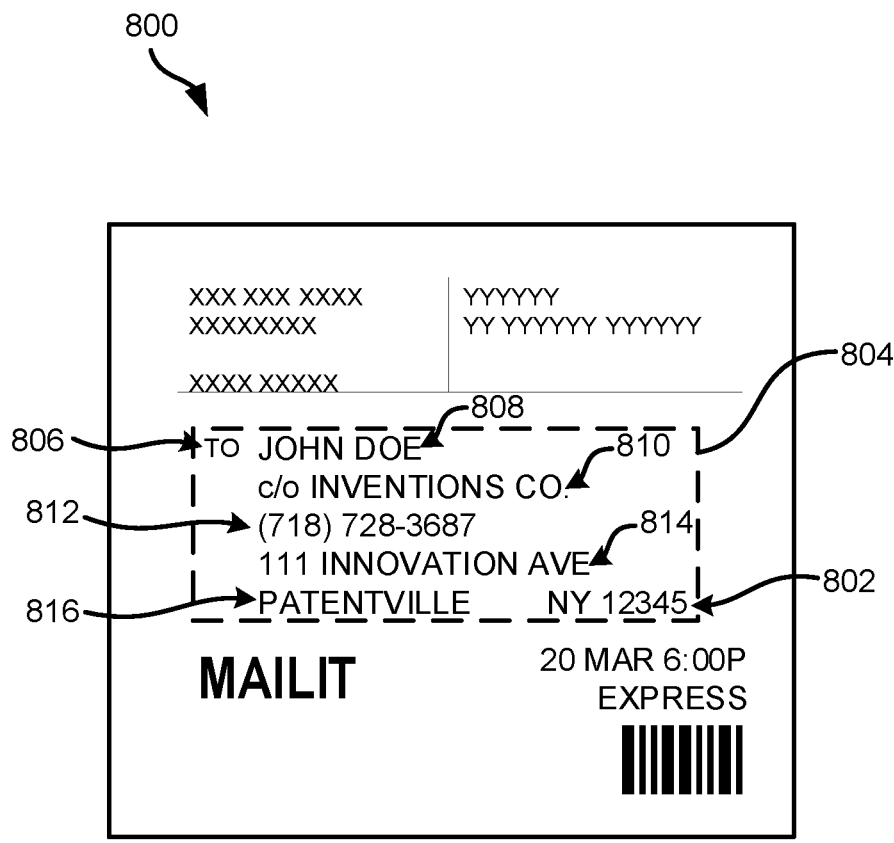
FIG. 8 is a schematic diagram of a label for data extraction during the performance of the method of FIG. 6.

Referring to FIG. 8, an example label 800 is depicted. During extraction of the US postal address, the device 104 may first identify a ZIP code line 802 at block 605 of the method 600. None of the lines below the ZIP code line 802 are left aligned with the ZIP code line and contain the country name, and hence no country line is added to the address block at block 610. A block 804 includes lines within threshold distances of the ZIP code line 802, and hence is added to the address block at block 615. Each of text lines 806, 808, 810, 812, 814, and 816 approximately satisfy the homogeneity of font features, however, the text line 806 is not left aligned with the remaining text lines, and hence the text line 806 is discarded at block 620. At block 625, the addressee, entity name, and telephone number lines 808-812 are discarded as being non-address lines. Thus, lines 814, 816, and 802 remain as the text lines defining the US postal address.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device for extracting target data from a source document, the computing device comprising:
a memory storing target data extraction rules;
a processor connected with the memory, the processor configured to:
obtain text recognition data returned from a text recognition process applied to an image of the source document, the text recognition data indicating locations of text structures on the source document;
define text lines based on the text recognition data by a smallest bounding box surrounding all words satisfying a same-line condition, wherein the same-line condition includes: (a) character heights of the words are within a predetermined percentage, and (b) the words are horizontally aligned;
identify a reference string from the text recognition data;
select a subset of the text lines based on a location of the reference string and the target data extraction rules; and
output the subset of the text lines as the target data.

2. The computing device of claim 1, wherein the processor is configured to:
obtain the image of the source document; and
apply an optical character recognition process to the image to obtain the text recognition data.

3. The computing device of claim 2, wherein the processor is further configured, prior to applying the optical character recognition process to the image, to:
detect superfluous features of the source document; and
remove the superfluous features of the source document.

4. The computing device of claim 1, wherein the processor is configured, to define the text lines, to:
select, from the text recognition data, a leading word;
determine if any additional words defined in the text recognition data satisfy the same-line condition; and
define the smallest bounding box for the text line, the smallest bounding box surrounding all the additional words satisfying the same-line condition.

5. The computing device of claim 4, wherein the same-line condition is further based on one or more of: a distance between words and a word orientation.

6. The computing device of claim 1, wherein the processor is further configured to:
obtain barcode data representing a location of a barcode;
based on the barcode data, identify an approximate location of the reference string; and
select a searching subset of text lines within a threshold distance of the approximate location of the reference string; wherein the reference string is identified in one of the text lines in the searching subset.

7. The computing device of claim 1, wherein the processor is further configured to:
obtain barcode data representing a location of a barcode; and
based on the barcode data, verify the target data based on a relative spatial relationship between the barcode and the subset of the text lines.

8. The computing device of claim 1, wherein the processor is configured, to identify the reference string, to:
identify a word in the text recognition data matching a predefined regular expression as a potential reference string; and
verify the potential reference string against a predetermined list of valid reference strings.

9. The computing device of claim 1, wherein the reference string is a ZIP code, and wherein the target data is a postal address.

10. The computing device of claim 9, wherein, to select the subset of the text lines representing the postal address, the processor is configured to:
select, as part of the subset, the text line containing the ZIP code;
select, as part of the subset, text lines in a block having at least one text line within a threshold distance of the text line containing the ZIP code;
discard text lines failing font homogeneity and alignment conditions; and
discard text lines failing to match a regular expression.

11. A method for extracting target data from a source document, the method comprising:
- storing target data extraction rules;
- obtaining text recognition data returned from a text recognition process applied to an image of the source document, the text recognition data indicating locations of text structures on the source document;
- defining text lines based on the text recognition data by a smallest bounding box surrounding all words satisfying a same-line condition, wherein the same-line condition includes: (a) character heights of the words are within a predetermined percentage, and (b) the words are horizontally aligned;
- identifying a reference string from the text recognition data;
- selecting a subset of the text lines based on a location of the reference string and the target data extraction rules; and
- outputting the subset of the text lines as the target data.

12. The method of claim 11, further comprising:
- obtaining the image of the source document; and
- applying an optical character recognition process to the image to obtain the text recognition data.

13. The method of claim 12, further comprising, prior to applying the optical character recognition process to the image:
- detecting superfluous features of the source document; and
- removing the superfluous features of the source document.

14. The method of claim 11, wherein defining the text lines comprises:
- selecting, from the text recognition data, a leading word;
- determining if any additional words defined in the text recognition data satisfy the same-line condition; and
- defining the smallest bounding box for the text line, the smallest bounding box surrounding all the additional words satisfying the same-line condition.

15. The method of claim 14, wherein the same-line condition is based on one or more of: a distance between words and a word orientation.

16. The method of claim 11, further comprising:
- obtaining barcode data representing a location of a barcode;
- based on the barcode data, identifying an approximate location of the reference string; and
- selecting a searching subset of text lines within a threshold distance of the approximate location of the reference string; wherein the reference string is identified in one of the text lines in the searching subset.

17. The method of claim 11, further comprising:
- obtaining barcode data representing a location of a barcode; and
- based on the barcode data, verifying the target data based on a relative spatial relationship between the barcode and the subset of the text lines.

18. The method of claim 11, wherein identifying the reference string comprises:
- identifying a word in the text recognition data matching a predefined regular expression as a potential reference string; and
- verifying the potential reference string against a predetermined list of valid reference strings.

19. The method of claim 11, wherein the reference string is a ZIP code, and wherein the target data is a postal address.

20. The method of claim 19, wherein selecting the subset of the text lines representing the postal address comprises:
- selecting, as part of the subset, the text line containing the ZIP code;
- selecting, as part of the subset, text lines in a block having at least one text line within a threshold distance of the text line containing the ZIP code;
- discarding text lines failing font homogeneity and alignment conditions; and
- discarding text lines failing to match a regular expression.

* * * * *